United States Patent
Tausheck

[19]

[11] Patent Number: 6,092,140

[45] Date of Patent: Jul. 18, 2000

[54] LOW LATENCY BRIDGING BETWEEN HIGH SPEED BUS NETWORKS

[75] Inventor: Eric Gregory Tausheck, Citrus Heights, Calif.

[73] Assignee: Hewlett-Packard Company, Palo Alto, Calif.

[21] Appl. No.: 09/080,060

[22] Filed: May 15, 1998

[51] Int. Cl.[7] .................................................. G06F 13/38

[52] U.S. Cl. .......................... 710/128; 710/129; 710/52; 710/46; 364/239; 364/241.1

[58] Field of Search ................................... 710/128, 129, 710/52, 53, 56, 57, 58, 60, 34, 46, 29; 364/241, 241.1, 238.6, 238.9, 239, 239.1, 239.3, 239.4, 239.7, 239.8; 709/250, 232–237

[56] References Cited

U.S. PATENT DOCUMENTS

| | | | |
|---|---|---|---|
| 5,377,184 | 12/1994 | Beal et al. ................................. | 370/24 |
| 5,448,701 | 9/1995 | Metz, Jr. et al. ......................... | 710/53 |
| 5,732,094 | 3/1998 | Petersen et al. .......................... | 710/57 |
| 5,809,339 | 9/1998 | Howkins et al. ......................... | 710/57 |

*Primary Examiner*—Ario Etienne

[57] ABSTRACT

A network bridge includes a processor, a common memory, a first interface to a first network and a second interface to a second network. Upon the first interface receiving a first request to transfer data from a device on the first network, the processor seeds a portion of a first buffer within the first common memory with a predetermined polling pattern. The processor polls the portion of the first buffer to determine when data has arrived into the first buffer. When the processor determines that data has arrived into the first buffer, the processor authorizes the second interface to set up a write process with a device on the second network.

20 Claims, 2 Drawing Sheets

LOW LATENCY BRIDGING BETWEEN HIGH SPEED BUS NETWORKS

BACKGROUND

The present invention concerns transmitting data over local area networks (LANs) and pertains particularly to low latency bridging between high speed bus networks.

For busses that operate according to the Small Computer Systems Interface (SCSI) protocol, I/O data transactions are initiated and controlled by an initiator (typically a processor or SCSI protocol bridge) which is connected to a SCSI bus. A SCSI protocol bridge is a device which manages SCSI processes between a computer and associated SCSI target devices.

Also connected to a SCSI bus are one or more targets. For example, a target is typically a computer peripheral device such as a hard drive, a CD ROM, a scanner or a printer. When operating in accordance with the SCSI protocol, an initiator is required to manage multiple concurrent input/output (I/O) data transactions in various stages of completion.

When using a SCSI protocol bridge, it is difficult to maintain temporal transparency and to maintain the ability to multiplex many concurrent processes in an application. It is especially difficult for outbound processes, which are characterized by having a data out phase (in response to a SCSI-2 DATA_OUT command). An outbound process is a transfer (of a copy) of some buffer of data from a computer (initiator) to a SCSI peripheral device (target). An outbound process is typically a SCSI write operation, for example.

The difficulty arises from two problem areas. The first area is due to the SCSI-2 protocol and SCSI target device implementations. The SCSI peripheral device may demand the data either immediately after receiving the associated command or at some significant delay after receiving the associated command. In the immediate case, it is desirable to have the data available to give upon demand quickly for lowest latency and best SCSI-2 bus utilization.

The second problem area is due to the nature of the bridging and the off the shelf components used to perform direct memory access (DMA) of data from the computer. In order to have efficient delivery of this data, the data must be "asked for" in sufficiently large portions to amortize the overhead of "asking" for each portion of data.

Typical DMA engines which deliver data in large portions are either only efficient with, or may only support, a report upon the complete arrival of the data requested. This leads to a cost tradeoff for implementation of a SCSI protocol bridge between latency and efficient utilization. In order to reduce latency to a minimum for one input output (I/O) data out process, risks under-utilizing the shared SCSI bus due to not having the data in time.

To most efficiently utilize the SCSI bus, the data should be pre-stored in the SCSI protocol bridge just in case the SCSI target devices demands it immediately after receiving and decoding the command. However, to wait for notification of data arrival induces a latency corresponding to the amount of data to be transferred per portion of data requested, which, must be maximized for efficiency.

These problems are exacerbated by particular SCSI protocol bridges. For example, a Fibre Channel SCSI-3 to SCSI-2 bus bridge, when acting as a SCSI-3 target, doesn't receive as quick a response to a DATA_OUT command as the response of a SCSI-2 target. This is because SCSI-2 uses a half duplex channel so that the entire SCSI-2 bus bandwidth is utilized when a SCSI target and initiator are transferring data. In this way SCSI-2 is optimized to minimize such latencies.

In contrast, the only penalty for a delay of data delivery with SCSI-3 run across Fibre Channel or other full duplex links, is the effect it has on that particular I/O process. Therefore, there are several SCSI-2 chip interfaces to various processor busses, memory busses and I/O busses which provide for a very low latency initiator response to a target's data transfer demands. However, there's a very loose temporal relationship inherent between the request for data and its subsequent arrival with Fibre Channel and similar full duplex links.

One solution is for the SCSI protocol bridge to launch a SCSI write process on the SCSI-2 bus at the earliest opportunity (e.g., as soon as the SCSI protocol bridge is notified that a SCSI-3 data out (FCP_DMND) command has been received and processed). However, launching the SCSI write process immediately can lead to a stall at the SCSI-2 peripheral device which, if a SCSI-2 parallel bus, also prevents other I/O process utilization of the SCSI-2 parallel bus during the stall. In addition, this may cause significant delay for other I/O process utilization if an opportunity to avoid mechanical movement is missed due to the delay in the SCSI Initiator interface providing data (such as addition disk rotations and/or falling out of tape streaming modes).

Another solution is to risk some low bus utilization and forward the SCSI write process at the earliest opportunity after requesting a portion of the data. In other words, smaller portions of data are requested over the SCSI-3 bus allowing for lower latency and quicker notification for an initial portion of data. One problem with this approach is that there are significant overheads associated with each portion of data requested. The addition of a relatively small portion for the purpose of launching I/O process through the SCSI protocol bridge has a significant performance cost. Another problem is that the SCSI-2 bus can be stalled significantly because there is no guarantee that asking for the data to be transferred over a SCSI-3 will result in timely delivery of the data. Further, the delays can pile up since there can be significant latencies for each subsequent portion requested. The more, smaller portions of data delivery, the more chances there are for added latency in the return of the requested data.

Another solution is to buffer a sufficient amount of data in the SCSI protocol bridge before ever launching the SCSI write process on the SCSI-2 side. This approach has the disadvantage of adding a latency that scales with the combination of the amount of data needed and its latency, as discussed above.

SUMMARY OF THE INVENTION

In accordance with the preferred embodiment of the present invention, a network bridge includes a processor, a common memory, a first interface to a first network and a second interface to a second network. Upon the first interface receiving a first request to transfer data from a device on the first network, the processor seeds a portion of a first buffer within the first common memory with a predetermined polling pattern. The processor polls the portion of the first buffer to determine when data has arrived into the first buffer. When the processor determines that data has arrived into the first buffer, the processor authorizes the second interface to set up a write process with a device on the second network.

In the preferred embodiment, upon the first interface receiving the first request to transfer data from a device on the first network, the processor additionally seeds a portion of a second buffer within the first common memory with the predetermined polling pattern. When the device on the second network indicates readiness to receive data, the second interface polls the portion of the second buffer to determine when data has arrived into the second buffer, thereby indicating that the first buffer is full. When the second interface determines that data has arrived into the second buffer, the second interface sends data in the first buffer to the device on the second network.

Likewise, upon the first interface receiving the first request to transfer data from a device on the first network, the processor additionally seeds a portion of a third buffer within the first common memory with the predetermined polling pattern. When data in the first buffer has been sent to the device on the second network, the second interface polls the portion of the third buffer to determine when data has arrived into the third buffer, thereby indicating that the second buffer is full. When the second interface determines that data has arrived into the third buffer, the second interface sends data in the second buffer to the device on the second network.

When data transfer from the device on the first network has been completed, the processor notifies the second interface and the second interface no longer polls data buffers.

In the preferred embodiment, the first network operates in accordance with the Small Computer Systems Interface 3 (SCSI-3) protocol and the second network operates in accordance with the Small Computer Systems Interface 2 (SCSI-2) protocol. Also, the common memory includes eight buffers which are used for the data transfer. When the second interface has transferred data from four of the buffers to the device on the second network, the second interface so notifies the processor allowing the processor to set up a new data transfer using the four buffers.

The present invention facilitates launching commands through a bridge based on knowledge of arrival of associated data.

By forwarding the command only after the data is known to have started to arrive, the design eliminates the potential latency from data request to data arrival from impacting the SCSI-2 bus. Also, by forwarding the command just as the data begins to arrive, the design need not suffer the entire latency for the arrival of the (first) transfer before ensuring that at least some data is available for forwarding to the SCSI-2 bus should the SCSI-2 target demand it immediately. This early arrival notification decouples the transfer size for the first portion of data requested from latency of starting concerns and allows the transfer to be larger than it otherwise might be.

Another advantage that also allows larger portion sizes is that the SCSI-3 interface can request data in relatively larger portions than is transferred over the SCSI-2 bus. Since the SCSI-2 side is able to detect data arrival at a smaller granularity and thus, does not have to wait the full latency of the SCSI-3 data request to be able to move some of the associated data. This helps performance when data transfer over the SCSI-3 bus falls behind data transfer over the SCSI-2 bus. This feature allows the SCSI-3 side to catch up again more quickly without sacrificing SCSI-3 overhead.

Decoupling the data transfer portion size from these latency concerns adds a degree of freedom in the non-trivial problem of choosing an optimal design portion size in the design. The result is relatively transparent timing behavior through the bridge as compared with no bridge.

DESCRIPTION OF THE PREFERRED EMBODIMENT

Figure 1:
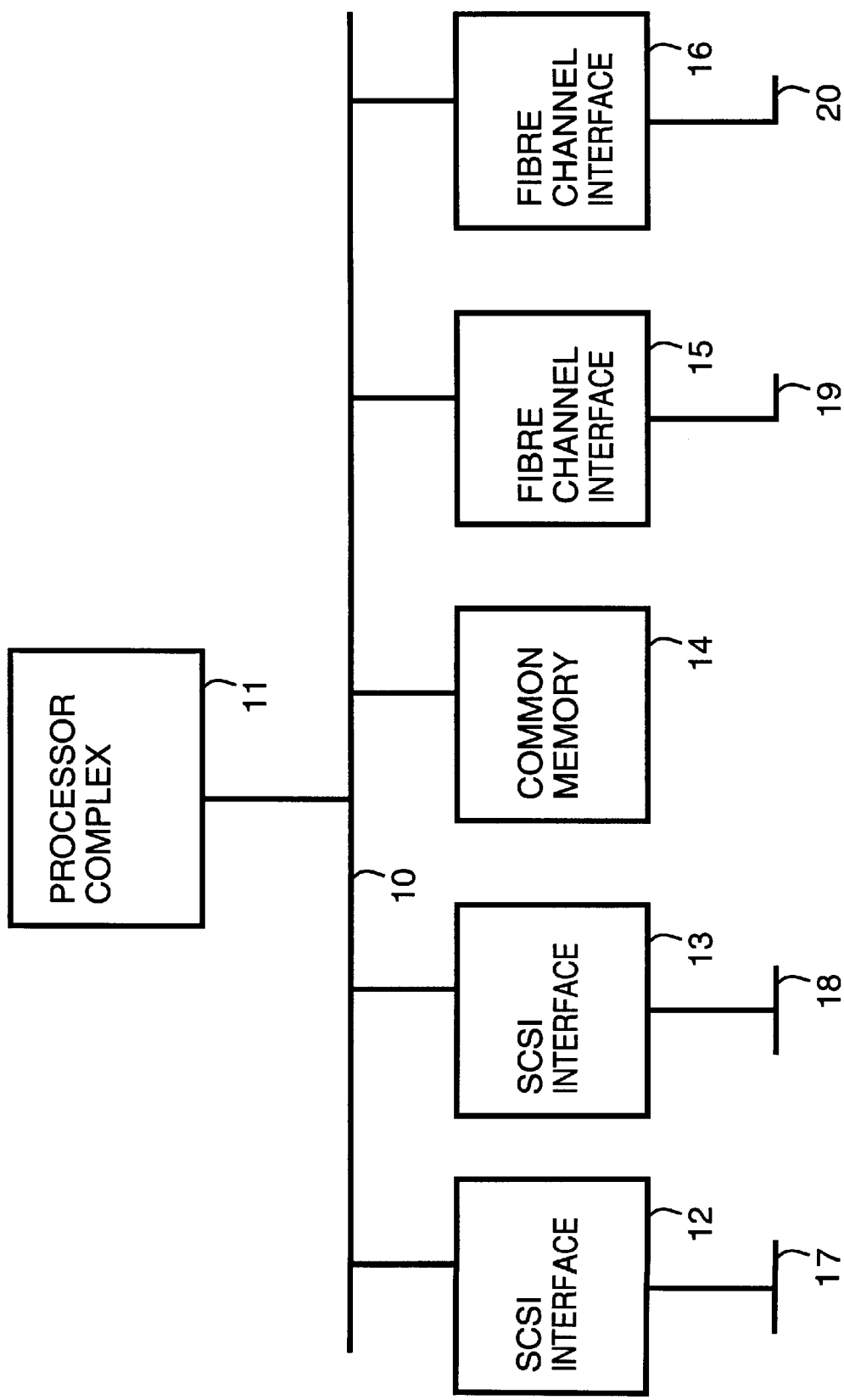
FIG. 1 is a simplified block diagram of a SCSI protocol bridge in accordance with a preferred embodiment of the present invention.

FIG. 1 is a simplified block diagram of a SCSI protocol bridge. A processor complex 11 includes, for example, a microprocessor, random access memory (RAM), read-only memory (ROM), and a user interface including light-emitting diodes (LEDs), user activated buttons, and so on.

A bus complex 10 allows data and commands to be transferred between processor complex 11, a SCSI interface 12, a SCSI interface 13, a common memory 14, a fibre channel interface 15 and a fibre channel interface 16.

SCSI interface 12 interfaces with a SCSI bus 17. SCSI bus 17 operates in accordance with the SCSI-2 bus protocol. SCSI interface 13 interfaces with a SCSI bus 18. SCSI bus 18 operates in accordance with the SCSI-2 bus protocol.

Fibre channel interface 15 interfaces with a fibre channel 19. Fibre channel 19 operates in accordance with the SCSI-3 protocol. Fibre channel interface 16 interfaces with a fibre channel 20. Fibre channel 20 operates in accordance with the SCSI-3 protocol.

In the preferred embodiment of the present invention, when transferring data from a fibre channel to a SCSI bus, the early arrival of data to the SCSI protocol bridge is detected. The early arrival of data can be detected at practically any desired granularity, independent from the portion of data requested from the fibre channel. This is achieved without the use of new hardware. The result is a reduction in latency for bridged I/O processes as compared to other solutions.

The advantages of the present invention are achieved by writing a pattern to one or more portions of memory within the SCSI protocol bridge which will buffer the data. The portions of memory which contain the pattern can be polled to determine when data has arrived, at least up to the position of where the pattern exists.

If by chance the data written into a buffer within the SCSI protocol bridge matches a pattern written into the buffer for polling purposes, the polling will not detect early arrival of data. However, the normal mechanism that reports the complete arrival of data will still indicate that the data has arrived. In this case, there is no latency savings. However, there is the extra cost of polling unsuccessfully. For this reason, the pattern written into the buffer must be chosen to be long enough and unique enough from anticipated data patterns so that such chance matching of patterns occurs infrequently. In practice, a 32 bit apparently random pattern has yielded excellent results.

Prior to the SCSI protocol bridge requesting any portion of data for a SCSI write process over a fibre channel, the SCSI protocol bridge places in the first 32 bits of a buffer which will receive the data, a pattern as described above. The SCSI protocol bridge does not launch the write process over the SCSI bus until either this pattern changes, or until the SCSI protocol bridge receives notification that all the data has arrived from over the fibre channel.

Once the SCSI protocol bridge launches the write process over the SCSI bus, the target of the write process may request data at any time. When the target does request the data, the data for a portion of the data transfer will either all have arrived in the SCSI protocol bridge, or the data may still be in transit. The SCSI interface polls (as further described below) the buffers in order to determine when the current desired portion of data is ready to be forwarded. In this way, the SCSI interface has a low latency method of resuming data transfer as soon as a current portion of data has arrived. This is particularly useful in the case where the target device is significantly "ahead" of the data being transferred to the SCSI protocol bridge.

Figure 2:
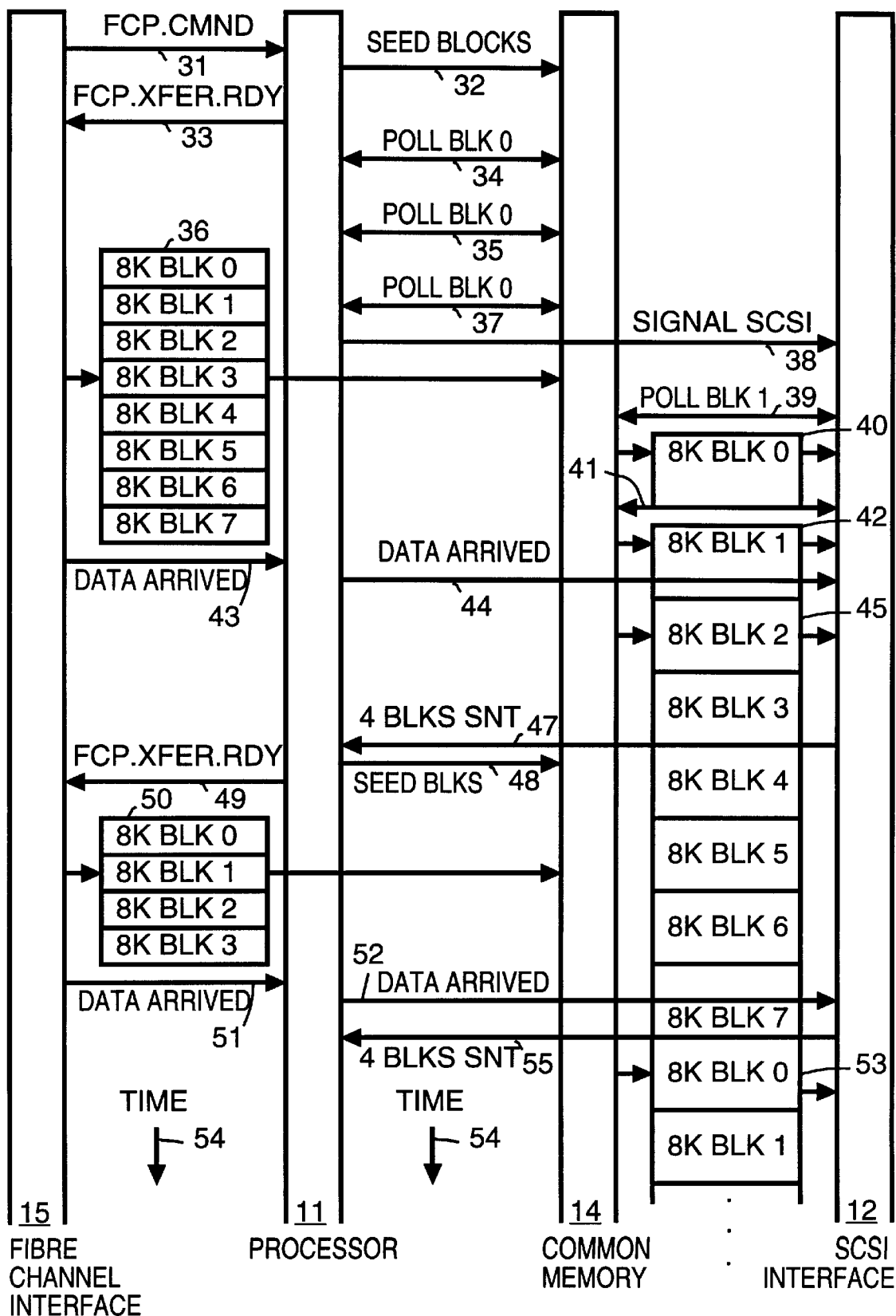
FIG. 2 is a simplified timing diagram which illustrates the relative timing of command transfers and data transfers within a SCSI protocol bridge in accordance with a preferred embodiment of the present invention.

FIG. 2 is a simplified timing diagram which illustrates the relative timing of command transfers and data transfers for a write process which is initiated on a fibre channel 19 and is targeted for a target device on SCSI bus 17. In the simplified timing diagram, time transpires along the y-axis as shown by arrows 54.

As represented by an arrow 31, a write process is initiated on a fibre channel 19 by a write command (FCP.CMND), which is received by fibre channel interface 15 and passed to processor complex 11. In common memory 14, eight 8K blocks are reserved as buffers for data transfers. Provided these blocks are available, processor complex 11 seeds a portion of each block (e.g., the first thirty-two bits of each block) with a polling pattern, as represented by an arrow 32. While in the preferred embodiment thirty-two bits are seeded, any portion or all of the buffer may be seeded. When seeding it is desirable that a large enough number of bits be seeded to reduce the likelihood that incoming data will match the pattern. However, the larger the portion that is seeded, the greater the overhead cost associated with the seeding. For the preferred embodiment, seeding thirty-two bits of each buffer provided a good balance between these competing criteria.

Once the blocks are seeded, processor complex 11 forwards a write ready command (FCP.XFER.RDY), as represented by an arrow 33, to fibre channel 15 interface which then forwards the write ready command through fibre channel 19 to the initiator of the write process. Provided all eight buffers are available, a data transfer of 64 K (filling 8 buffers) is authorized.

Processor 11 then periodically polls the seeded portion of the first buffer (block 0) in order to detect when data has arrived from fibre channel 19. The periodic polling is represented by an arrow 34, an arrow 35 and an arrow 37. The polling represented by arrow 34 indicates that the seeded portion of the first buffer (block 0) has not changed, so processor complex 11 presumes no data has arrived from fibre channel 19. Likewise, the polling represented by arrow 35 indicates that the seeded portion of the first buffer (block 0) has not changed, so processor complex 11 presumes no data has arrived from fibre channel 19.

After the polling represented by arrow 35 and before the polling represented by arrow 37, a portion of the data for the data transfer begins to be received by fibre channel 15 and loaded into the buffers in common memory 14, as illustrated by data blocks 36. At the time of the polling represented by arrow 37, the first buffer (block 0) has been already loaded with data and the second buffer (block 1) is being loaded with data.

Thus the polling represented by arrow 37 indicates that the seeded portion of the first buffer (block 0) has changed, so processor complex 11 presumes data has arrived from fibre channel 19. At this time processor 11 sends a write command (SIGNAL SCSI), represented by an arrow 38, to SCSI interface 12 which is forwarded over SCSI bus 17 to the target for the data transfer.

When the target indicates that it is ready for the data, SCSI interface 12 polls the seeded portion of the second buffer (block 1), as represented by arrow 39, in order to detect whether the first buffer has been completely filled. Because the buffers are filled in order, the fact that the seeded pattern in the second buffer has changed indicates that the first buffer has been filled. When SCSI interface 12 polls the seeded portion of the second buffer (block 1), it discovers that the seeded pattern in the second buffer has changed. Thus SCSI interface 12 obtains the data from the first buffer (block 1) and forwards the data through SCSI bus 17 to the target device.

After the data in the first buffer has been transferred to the target, SCSI interface 12 polls the seeded portion of the third buffer (block 2), as represented by arrow 41, in order to detect whether the second buffer has been completely filled. The fact that the seeded pattern in the third buffer has changed indicates that the second buffer has been filled. When SCSI interface 12 polls the seeded portion of the third buffer (block 2), it discovers that the seeded pattern in the third buffer has changed. Thus SCSI interface 12 obtains the data from the second buffer (block 2) and forwards the data through SCSI bus 17 to the target device.

When fibre channel interface 15 has completed reception of the 64 K of data from fibre channel 19 and loaded the 64K of data into the eight buffers within common memory 14, fibre channel interface 15 sends a data arrived message to processor complex 11, as represented by an arrow 43.

Processor complex 11, upon receiving the data arrived message from fibre channel interface 15, forwards the data arrived message to SCSI interface 12, as represented by an arrow 44.

After the data in the second buffer has been transferred to the target, SCSI interface 12 retrieves data in the third buffer (block 2) from common memory 11 and begins to transfer the data to the target. It is not necessary for SCSI interface 12 to do any further polling since SCSI interface 12 has received from processor complex 11 the data arrived message, as represented by arrow 44.

After the data in the third buffer has been transferred to the target, SCSI interface 12 retrieves data in the fourth buffer (block 3) from common memory 11 and begins to transfer the data to the target.

After the data in the fourth buffer has been transferred to the target, SCSI interface 12 retrieves data in the fifth buffer (block 4) from common memory 11 and begins to transfer the data to the target. Additionally, SCSI interface 12 sends a message, as represented by arrow 47, to processor 11 indicating that four blocks of data have been sent.

Upon receiving the message, as represented by arrow 47, that four blocks of data have been sent, processor complex 11 seeds, as represented by arrow 48, a portion of each of the newly freed up buffers (block 0, block 1, block 2 and block 3), for additional data.

Once the blocks are seeded, processor complex 11 forwards a write ready command (FCP.XFER.RDY), as represented by an arrow 49, to fibre channel 15 interface which then forwards the write ready command through fibre channel 19 to the initiator of the write process. In this case, a data transfer of 32 K (filling 4 buffers) is authorized.

A portion of the data for the data transfer begins to be received by fibre channel 15 and loaded into the seeded buffers in common memory 14, as illustrated by data blocks 50.

When fibre channel interface 15 has completed reception of the 32 K of data from fibre channel 19 and loaded the 34K of data into the four buffers (block 0, block 1, block 2 and block 3) within common memory 14, fibre channel interface 15 sends a data arrived message to processor complex 11, as represented by an arrow 51. Processor complex 11, upon receiving the data arrived message from fibre channel interface 15, forwards the data arrived message to SCSI interface 12, as represented by an arrow 52.

After the data in the eighth buffer (block 7) has been transferred to the target, SCSI interface 12 retrieves data in the first buffer (block 0) from common memory 11 and begins to transfer the data, as represented by blocks 53, to the target. It is not necessary for SCSI interface 12 to do any polling since SCSI interface 12 has received from processor complex 11 the data arrived message, as represented by arrow 52.

Additionally, SCSI interface 12 sends a message, as represented by arrow 55, to processor 11 indicating that four blocks of data have been sent.

Upon receiving the message, as represented by arrow 55, that four blocks of data have been sent, processor complex 11 can seed a portion of each of the newly freed up buffers (block 4, block 5, block 6 and block 7) if there is additional data to be sent. This process proceeds until all the data for the write process has been sent.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for buffering data within a bridge between a first network and a second network, the method comprising the following steps:
   (a) upon receiving a first request to transfer data from a device on the first network, seeding a portion of a first buffer with a predetermined polling pattern;
   (b) polling the portion of the first buffer to determine when the data has arrived into the first buffer; and,
   (c) when in step (b) it is determined that data has arrived into the first buffer, initiating a write process with a device on the second network.

2. A method as in claim 1 wherein step (a) additionally includes seeding a portion of a second buffer with a predetermined polling pattern upon the first request to transfer data being received.

3. A method as in claim 2 additionally comprising the following steps:
   (d) when the device on the second network indicates readiness to receive data, polling the portion of the second buffer to determine when data has arrived into the second buffer, thereby indicating that the first buffer is full; and
   (e) when in step (d) it is determined that data has arrived into the second buffer, sending data in the first buffer to the device on the second network.

4. A method as in claim 3 wherein step (a) additionally includes seeding a portion of a third buffer with a predetermined polling pattern upon the first request to transfer data being received.

5. A method as in claim 4 additionally comprising the following steps:
   (f) when data in the first buffer has been sent to the device on the second network, polling the portion of the third buffer to determine when data has arrived into the third buffer, thereby indicating that the second buffer is full; and
   (e) when in step (d) it is determined that data has arrived into the third buffer, sending data in the second buffer to the device on the second network.

6. A method as in claim 5 additionally comprising the following step:
   (g) when data transfer from the device on the first network has been completed, no longer polling data buffers.

7. A network bridge comprising:
   a processor;
   a common memory;
   a first interface to a first network; and
   a second interface to a second network;
   wherein upon the first interface receiving a first request to transfer data from a device on the first network, the processor seeds a portion of a first buffer within the first common memory with a predetermined polling pattern;
   wherein the processor polls the portion of the first buffer to determine when data has arrived into the first buffer; and,
   wherein when the processor determines that data has arrived into the first buffer, the processor authorizes the second interface to set up a write process with a device on the second network.

8. A network bridge as in claim 7 wherein upon the first interface receiving the first request to transfer data from a device on the first network, the processor additionally seeds a portion of a second buffer within the first common memory with the predetermined polling pattern.

9. A network bridge as in claim 8 wherein when the device on the second network indicates readiness to receive data, the second interface polls the portion of the second buffer to determine when data has arrived into the second buffer, thereby indicating that the first buffer is full, and when the second interface determines that data has arrived into the second buffer, the second interface sends data in the first buffer to the device on the second network.

10. A network bridge as in claim 9 wherein upon the first interface receiving the first request to transfer data from a device on the first network, the processor additionally seeds a portion of a third buffer within the first common memory with the predetermined polling pattern.

11. A network bridge as in claim 10 wherein when data in the first buffer has been sent to the device on the second network, the second interface polls the portion of the third buffer to determine when data has arrived into the third buffer, thereby indicating that the second buffer is full, and when the second interface determines that data has arrived into the third buffer, the second interface sends data in the second buffer to the device on the second network.

12. A network bridge as in claim 11 wherein when data transfer from the device on the first network has been completed, the processor notifies the second interface and the second interface no longer polls data buffers.

13. A network bridge as in claim 7 wherein the first network operates in accordance with the Small Computer Systems Interface 3 (SCSI-3) protocol and the second network operates in accordance with the Small Computer Systems Interface 2 (SCSI-2) protocol.

14. A network bridge as in claim 7 wherein the common memory includes eight buffers which are used for the data transfer and when data transfer from the device on the first network has been completed, the processor notifies the second interface and the second interface no longer polls data buffers.

15. A network bridge as in claim 7 wherein the common memory includes eight buffers which are used for the data transfer and when the second interface has transferred data from four of the buffers to the device on the second network, the second interface so notifies the processor allowing the processor to set up a new data transfer using the four buffers.

16. A method for buffering data comprising the following steps:

(a) upon receiving a first request to transfer data, seeding a portion of a first buffer with a predetermined polling pattern; and (b) polling the portion of the first buffer to determine when the data has arrived into the first buffer.

17. A method as in claim 16 wherein step (a) additionally includes seeding a portion of a second buffer with a predetermined polling pattern upon the first request to transfer data being received.

18. A method as in claim 17 additionally comprising the following steps:

(c) when a device indicates readiness to receive data, polling the portion of the second buffer to determine when data has arrived into the second buffer, thereby indicating that the first buffer is full; and (d) when in step (d) it is determined that data has arrived into the second buffer, sending data in the first buffer to the device.

19. A method as in claim 18 wherein step (a) additionally includes seeding a portion of a third buffer with a predetermined polling pattern upon the first request to transfer data being received.

20. A method as in claim 19 additionally comprising the following steps:

(e) when data in the first buffer has been sent to the device, polling the portion of the third buffer to determine when data has arrived into the third buffer, thereby indicating that the second buffer is full; and (f) when in step (e) it is determined that data has arrived into the third buffer, sending data in the second buffer to the device.

* * * * *